(12) United States Patent
Lonbani et al.

(10) Patent No.: US 6,454,059 B1
(45) Date of Patent: Sep. 24, 2002

(54) APPARATUS AND METHOD FOR A MAGNETO-RHEOLOGICAL (MR) DAMPING DEVICE

(75) Inventors: Sohrab Sadri Lonbani, Xenia; John H. Muhlenkamp, Dayton; Patrick N. Hopkins, West Carrollton; Ilya Lisenker, Miamisburg; Venkatasubramanian Ananthanarayanan, Beaver Creek, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/826,020

(22) Filed: Apr. 4, 2001

(51) Int. Cl.[7] .............................. F16F 9/53; F16K 31/02
(52) U.S. Cl. ...................................... 188/267; 137/909
(58) Field of Search .................. 267/140.14; 188/267.1, 188/267.2; 251/129.01; 137/909

(56) References Cited

U.S. PATENT DOCUMENTS

| | | | |
|---|---|---|---|
| 3,240,245 A | * | 3/1966 | Martinek et al. ........ 188/267.1 |
| 5,277,281 A | | 1/1994 | Carlson et al. ............. 188/267 |
| 5,284,330 A | * | 2/1994 | Carlson et al. ........ 267/140.14 |
| 5,398,917 A | | 3/1995 | Carlson et al. ........ 267/140.14 |
| 5,956,951 A | | 9/1999 | O'Callaghan ................. 60/326 |
| 6,019,201 A | | 2/2000 | Gordaninejad et al. .. 188/267.1 |
| 6,045,486 A | * | 8/2000 | Ivers et al. ............... 188/267.1 |

* cited by examiner

Primary Examiner—Matthew C. Graham
(74) Attorney, Agent, or Firm—Scott A. McBain

(57) ABSTRACT

A magneto-rheological damping device comprises a core element for carrying a magnetic flux and a magnetic flux generator positioned adjacent to a portion of the core element and operable to generate a magnetic flux in the core element. A sleeve is positioned over the core element and magnetic flux generator and includes a plurality of protrusions extending generally radially outwardly from a center of the core element. A flux ring surrounds the core element and sleeve and defining a passage between flux ring and core element for the flow of a magneto-rheological fluid. The sleeve protrusions are configured to engage the flux ring and secure the flux ring in a concentric position around the core element and sleeve.

20 Claims, 1 Drawing Sheet

APPARATUS AND METHOD FOR A MAGNETO-RHEOLOGICAL (MR) DAMPING DEVICE

FIELD OF INVENTION

This invention relates generally to Magneto-Rheological (MR) devices and more particularly to an improved design for an MR damping device.

BACKGROUND OF THE INVENTION

Devices for suspending parts and controlling or damping their movement relative to one another, are known in the art. For example, such devices are known and used in the automotive field in vehicle suspension systems. The devices might take the form of shocks, struts and other motion or vibration damping devices.

Generally, many such devices utilize fluids for controlling the relative movement of the mechanical parts. For example, hydraulic fluid may be utilized as a medium for creating damping forces or torques or controlling motion, shock and vibrations. One class of such movement control devices utilizes a fluid medium which has characteristics which are controllable through the use of magnetic fields and/or magnetic flux. Such magnetically controlled fluid is referred to as magneto-rheological, or MR, fluid and is comprised of small, soft magnetic particles dispersed within a liquid carrier. The particles are often generally round, and the suitable liquid carrier fluids include hydraulic oils and the like for suspending the particles. MR fluids exhibit a thickening behavior (a rheology change), often referred to as "apparent viscosity change," upon being exposed to magnetic fields of sufficient strength. The higher the magnetic field strength to which the MR fluid is exposed, the higher the flow restriction or damping force that can be achieved in the MR device, and vice versa. That is, the flow properties of MR fluids may be selectively altered by magnetic fields.

A typical MR damping device, for example, utilizes an iron core structure disposed within or surrounded by a metal cylinder or casing. MR fluid is positioned to flow between the core and the metal cylinder. The damping effect of the device is due to the relative movement of the core and cylinder with respect to the MR fluid or vice versa. That is, depending upon the use and structure of the MR damping device, the core and cylinder are dynamic and move through the MR fluid or the MR fluid moves between a stationary core and cylinder. To control the damping effects of the device, a magnetic flux is formed in and around the core and the metal cylinder, such that the core and cylinder create a magnetic circuit. The metal cylinder or casing surrounding the core is often referred to as a "flux ring" as it directs and provides a path for the magnetic flux which exists in and around the core. Variation of the flux in the device affects the flow of the MR fluid between and around the core and flux ring and thus allows variation of the damping effects of the MR device.

More specifically, during operation of the damping device, the MR fluid flows through a restricted passage or gap formed between the flux ring and the core. Magnetic flux exists within the gap, and therefore, the characteristics of the MR fluid flow through the gap are magnetically controlled by controlling the magnetic flux. By controlling the characteristics of the MR fluid flow, the movement of the core and flux ring relative to the fluid is controlled, thus creating a damping effect to the physical structures which are operably coupled to the MR damping device. To form and vary the magnetic flux in and around the core and within the gap between the core and the flux ring, a magnetic field generator, such as a wire coil is wound around the core. The magnetic flux in the core and in the fluid passage is varied by variation of the electrical current through the coil. The selectively variable magnetic flux dictates the characteristics of the fluid flow in the restricted passage, and the relative movement any mechanical parts and the damping of that movement is then regulated by controlling the characteristics of the fluid flow.

When constructing and assembling a typical MR damping device, as described above, the core and the wire coil which is wound around the core are formed with an insulative material. The material, which may be an insulative plastic material, is molded flush around the coil to protect the coil from the MR fluid. Thereafter, the flux ring, or other metal casing surrounding the core and coil, is placed around the core and coil. Generally, the flux ring is placed concentrically around the core and coil combination to form a fixed annular gap between the flux ring and the core. The MR fluid flows within the gap. As such, it is important to ensure that the gap is generally consistently formed and spaced with respect to the core for uniformity of the damping forces created by the MR damping device. Therefore, the flux ring must be properly located and aligned around the core and coil. In conventional designs of MR damping devices, various fasteners and structures are necessary to provide the proper securement and alignment of the flux ring. For example, non-magnetic hog-rings, needle bearings, and rivets are utilized between the flux ring and the core at three or four positions along the length of the device. Alternatively, two end plates are crimped in place with the flux ring and core for alignment and retention.

While current MR damping devices are suitable to provide the damping forces required, their current design and construction makes them difficult to assemble. Multiple steps are necessary for proper positioning of the elements with respect to each other, particularly with respect to placement of the flux ring. As may be appreciated, multiple steps within a manufacturing and assembly process increase the cost of such a process.

A further drawback to current MR damping device designs is that special fasteners are necessary for locating and aligning the flux ring with respect to the core and coil. Such fastening structures increase the number of parts of the design, providing additional handling and assembly steps and also increasing the cost of the assembly process. Furthermore, using a design with endplates, additional "dead" length occurs along the length of the core and flux ring.

Another particular drawback of the current design is the need for proper location and alignment of the flux ring with respect to the core and coil. It is important that the annular gap has a consistent spacing along the length of the flux ring and core. As may be appreciated, such precise attention to location and alignment of the elements of the MR damping device further increases the assembly steps necessary and thus increases the manufacturing and assembly costs for the device.

The above-mentioned drawbacks of conventional MR damping devices and the manufacture and assembly of same, are further exacerbated by the variations which occur in the assembly due to variations in the various pieces which must be used and aligned. Inconsistency is introduced as a result of batch-to-batch or part-to-part variations of the multiple components which are necessary for construction of the devices. Furthermore, such differences make consistent alignment and location of the components of the device difficult. Of course, all such factors further increase the cost of manufacturing and assembling of the MR damping devices.

Therefore, it is a general objective of this present invention to improve existing MR damping devices, and specifically to improve their design.

It is another objective of the present invention to make such MR damping devices easier and more cost effective to assemble by reducing the assembly steps and also reducing the complexity of such assembly steps.

It is a further objective of the invention to reduce the cost of manufacturing an MR damping device by reducing the number of separate parts which must be handled and utilized in the manufacturing and assembly processes.

It is another objective of the invention to simplify the location and alignment steps associated with certain components of an MR damping device during assembly of such a device.

It is still another objective of the invention to reduce the cost increase in the assembly process which is due to the inconsistencies introduced into such a process by batch-to-batch or part-to-part variations of the multiple necessary components.

These objectives and other objectives are addressed by the present invention which is described in greater detail hereinbelow.

The Magneto-Rheological (MR) damping device of this application addresses the above objectives and utilizes a unique construction for improved performance and enhanced fabrication and manufacturing.

SUMMARY OF THE INVENTION

A magneto-rheological (MR) damping device of the invention comprises a core element for carrying a magnetic flux, and a magnetic flux generator, such as a conductive coil, positioned adjacent to a portion of the core element and operable to generate a magnetic flux in the core element. In one embodiment, the conductive coil is wound around the core element. A flux ring surrounds the core element and coil and defines a passage between the flux ring and core element for the flow of an MR fluid. The flux ring is operable for forming a magnetic circuit with the core element and is further operable for confining a portion of the magnetic flux proximate the core element and in the passage.

In accordance with one aspect of the present invention, an insulative sleeve is positioned over the core element and magnetic flux generator to electrically insulate the flux generator from the MR fluid. For example, the sleeve might be press fit over the core element and magnetic flux generator, or might be more loosely positioned. The sleeve includes a plurality of protrusions which extend generally radially outwardly from a center of the core element. The protrusions are configured to engage the flux ring and secure the flux ring in a proper position around the core element and sleeve. More specifically, the protrusions are configured and dimensioned to concentrically align the flux ring with the core element and the center axis of the MR damping device when the flux ring is pressed or placed in position. The protrusions extend radially outwardly generally in equal distances from the center of the core element and are operable to thereby secure the flux ring generally concentrically around the core element and sleeve.

In one embodiment of the invention, the sleeve is molded, such as utilizing a suitable moldable plastic or ceramic, and the protrusions are formed or molded integrally with the sleeve. The protrusions extend longitudinally along a portion of the length of the core element, and may extend generally along the entire length of the core element. Preferably, the protrusions will be positioned annularly around the sleeve in at least three positions for securing and centering the flux ring. For further centering and securing the flux ring, a greater number of protrusions might also be utilized around the sleeve. When the flux ring is pressed or otherwise placed on the core element, the protrusions will hold it in position.

The present invention improves the design of an MR damping device and makes such devices easier and more cost effective to assemble, while reducing the assembly steps and also reducing the complexity of such assembly steps. Furthermore, the number of separate parts which must be handled and utilized during manufacture and assembly is reduced. This reduces inconsistencies based on batch-to-batch or part-to-part variation of such components, and also simplifies the location and alignment steps associated with certain components of the MR damping device during assembly. These advantages and other advantages will become more apparent from the Detailed Description of the invention below.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION

Figure 1A:
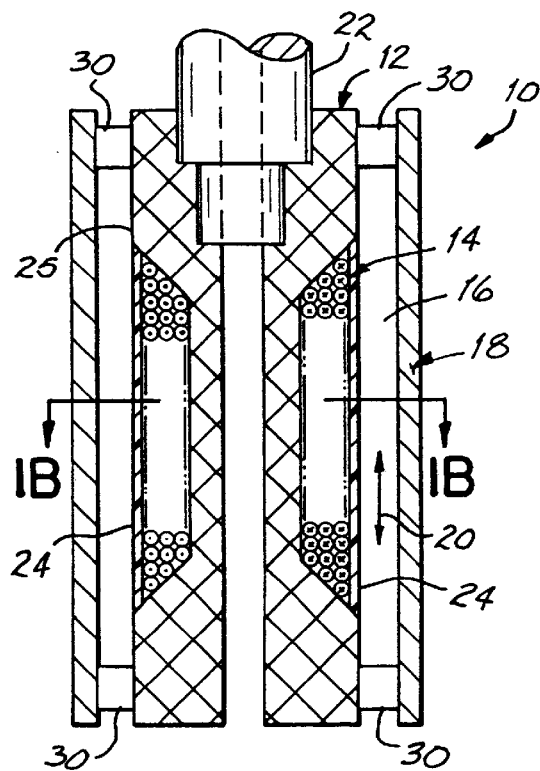
FIG. 1A is a longitudinal cross-sectional view of a conventional MR damping device.

FIG. 1A illustrates, in longitudinal cross-sectional view, one embodiment of an existing magneto-rheological (MR) damping device for comparison to the present invention for purposes of illustrating the features of the present invention. Throughout this application, the magneto-rheological characteristics of the device and fluid used therein will be referred to as "MR." The MR damping device 10 comprises a core element 12 utilized in combination with a magnetic flux generator 14. The core element 12 will usually be a magnetizable material, such as a ferrous material, which is capable of carrying a magnetic flux therein. The magnetic flux within the core element 12, and contained proximate the core element, affects the flow of MR fluid within a passage 16 according to well-known MR principles.

Forming passage 16 with the core element 12 and magnetic flux generator 14 is a metal casing 18, often referred to as a flux ring. The flux ring 18 is formed of a material which is also capable of carrying a magnetic flux. The core element 12, magnetic flux generator 14, and flux ring 18, act as a magnetic circuit, thereby confining a portion of the magnetic flux within and proximate to the core element 12, and therefore within passage 16 to affect any MR fluid flowing in the passage 16. To that end, the flux ring 18 will generally be made of a magnetizable material, such as a ferrous material. In accordance with one embodiment of the invention, the core element and flux ring are generally cylindrical, and the magnetic flux generator 14 is a conductive coil, such as a wire coil, which is wound around the core element 12 to generate a magnetic flux in the core element. Of course, the MR damping device 10 may take other shapes as well, although a cylindrical shape is conventional.

Figure 1B:
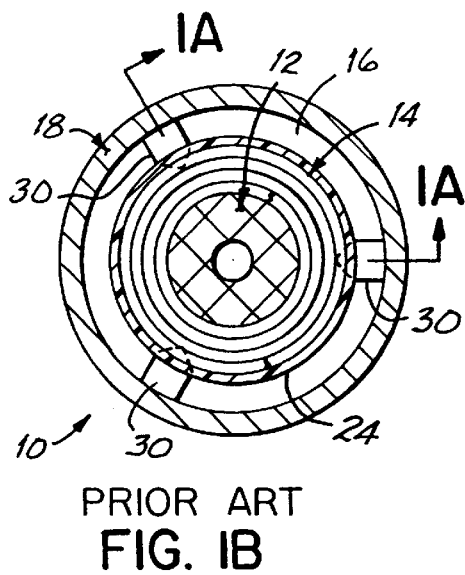
FIG. 1B is a transverse cross-sectional view along line 1B—1B of a conventional MR damping device.

Referring to FIGS. 1A and 1B, in order to electrically insulate the magnetic flux generator 14, such as a conductive coil, from the MR fluid 20, a layer of plastic material 24 is molded over the coil 14, generally flush with an outer diameter 25 of the core element 12. The coil 14 includes a plurality of inner turns 14b and outer turns 14a and is wound around core element 12 until the coil is generally flush with outer surface 25 of the core element.

As is generally known with MR devices, magnetic flux generated within the coil 14 and confined proximate the core element 12 by the flux ring 18 crosses the passage 16 and affects the flow of MR fluid within the passage. The MR fluid and its flow is indicated by the reference arrow 20 within FIG. 1A. Various different suitable MR fluids are known in the art.

In accordance with MR damping device operation, increasing the magnetic flux in the core element 12 and flux ring 18 allows for selective variation in the flow characteristics of the MR fluid 20 within the passage 16. More specifically, the magnetic flux affects the rheology of the fluid and, therefore, its flow characteristics. The fluid flow characteristics, in turn, determine the damping effect of the device.

The MR damping device 10 is utilized to dampen the movement of mechanical components. In some forms, the MR damping device 10 utilizes a generally stationary core element 12 and flux ring 18, and the MR fluid 20 flows within the passage. One such damping device is a damping valve wherein fluid flows into and out of the valve based upon the MR characteristics of the valve. In another form, the damping device utilizes a core element 12 and a flux ring 18 which are dynamic and are physically coupled to a moving mechanical part, such as a piston shaft 22, as illustrated in FIG. 1A. For example, the MR damping device 10 might be utilized as part of a shock absorber assembly, wherein the core element 12 and flux ring 18 act as the head of the piston and move within a casing of a shock absorber containing the MR fluid. In that way, the core element 12 and flux ring 18 move within the MR fluid 20 to make the MR fluid flow within the passage 16. Damping the movement of the core element and flux ring dampens the movement of the shaft 22.

As noted above, core element 12 and flux ring 18 are generally physically coupled together to define the annular passage 16. To that end, in prior art MR damping devices, the flux ring 18 is secured to the core element 12 by suitable fasteners. In FIGS. 1A and 1B, fasteners 30 are shown coupled between core element 12 and flux ring 18 at various positions along the length of the core element. The fasteners 30 may be non-magnetic hog-rings, needle bearings, or rivets which are pressed between the flux ring 18 and the core element 12. Generally, the fasteners 30 are coupled between the core element and flux ring at various annular positions around the core element, as shown in FIG. 1B. In the embodiment illustrated in FIGS. 1A and 1B, sets of individual fasteners 30 are shown at various positions along the length of the damping device 10. The fasteners 30 are shown in sets of 3 positioned annularly around the core element. The fasteners are preferably equally spaced around the core element to concentrically align the flux ring 18. Of course, a greater number of fasteners might also be utilized at each position for proper securement and alignment of the flux ring. The fasteners 30 are shown grouped proximate either end of the core element. As noted above, there are various drawbacks associated with conventional damping device assemblies as similar to those illustrated in FIGS. 1A and 1B. The additional fastener parts associated with the assembly, as well as the need to concentrically align the core element and flux ring with multiple fasteners increases the complexity of the manufacturing and assembly process and thus increases the cost of such process. The present invention addresses such drawbacks, as noted further hereinbelow.

Figure 2:
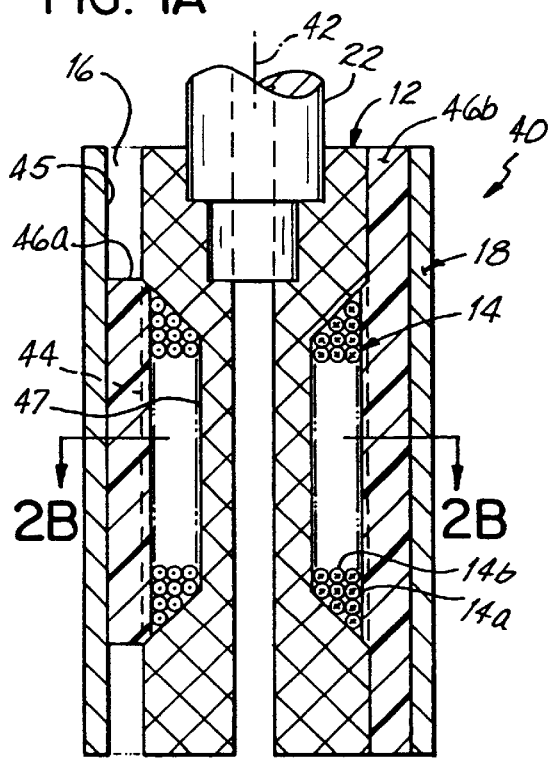
FIG. 2 is a longitudinal cross-sectional view of one embodiment of the inventive MR damping device.
Figure 2B:
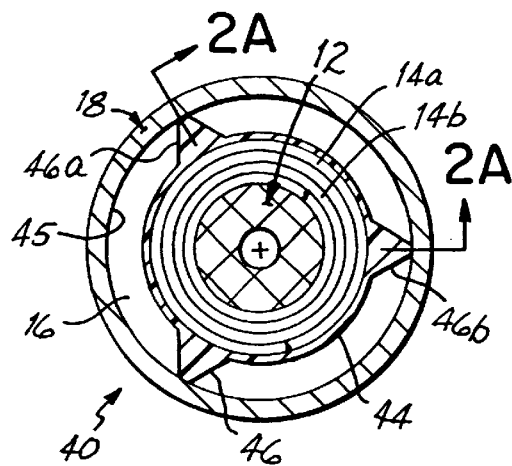
FIG. 2B is a transverse cross-sectional view along line 2B—2B of one embodiment of the inventive MR damping device.

Turning now to FIGS. 2A and 2B, one embodiment of the invention is illustrated. FIG. 2A illustrates a damping device 40 in longitudinal cross-section, whereas FIG. 2B illustrates the embodiment in transverse cross-section. The inventive MR damping device 40 utilizes some similar elements as the conventional damping device 10 and, therefore, some similar reference numerals will be utilized. For example, damping device 40 utilizes a core element 12, magnetic flux generator 14, flux ring 18. The MR damping device defines a passage 16 between the core element and flux ring, and may include a piston rod 22 coupled thereto, depending upon the use of the damping device 40. However, the inventive damping device eliminates the need for multiple separate fasteners 30 which must be precisely and specifically aligned between the flux ring and core element to provide for concentric positioning of the flux ring and self-centering of the ring around the center, or center axis 42, as illustrated in FIGS. 2A and 2B. As discussed hereinabove, the magnetic flux generator may be a conductive coil with a plurality of coil turns 14a, 14b, as illustrated in the Figures.

In accordance with one aspect of the present invention, a sleeve 44 is positioned over the core element 12 and magnetic flux generator 14. The sleeve is formed of an electrically insulative material and includes a plurality of protrusions or projections 46 which extend radially outwardly from the center or center axis 42 of the core element. As will be appreciated, the center or center axis 42 of the core element also defines the center or center axis of the damping device 40. The sleeve protrusions 46 are configured to extend outwardly and engage an inner surface 45 of the flux ring 18 and secure the flux ring 18 in position around the core element 12, the magnetic flux generator 14, and the sleeve 44. In that way, individual fasteners 30 are eliminated from the damping device 40 and the assembly thereof.

In one embodiment of the invention, the plurality of protrusions 46 are integrally formed with the sleeve, and are thereby secured in place with the sleeve around the core element 12 and magnetic flux generator 14. The sleeve and protrusions may be formed out of a suitable insulative plastic or ceramic material. In accordance with one aspect of the present invention, the protrusions extend radially outwardly, generally in equal distance from the sleeve and center axis 42 of the core element 12 and are operable to secure the flux ring 18 generally concentrically around the core element and the sleeve 44. Generally, for MR damping devices, it is important for the flux ring to be concentric and/or self-centered with respect to the core element to provide a passage 16 which has similar annular dimensions around the damping device 40. In that way, the magnetorheological effect on the fluid flowing in passages 16 is consistent annularly around the MR damping device.

In accordance with another aspect of the present invention, not only do the protrusions eliminate the need for separate fasteners and the additional assembly steps associated therewith, but also the inventive protrusions add a self-centering aspect to the flux ring with respect to the core element, without any additional assembly steps. When the flux ring is pressed onto or otherwise positioned on the sleeve, the flux ring will be automatically centered around the device. Accordingly, the invention reduces parts and labor costs and the complexities associated with manufacturing and assembling an MR damping device. Furthermore, by eliminating the parts, the effects of batch-to-batch and part-to-part variations within the assembly can be reduced.

In accordance with still another aspect of the present invention, the protrusions are preferably positioned concentrically around the core in at least three positions for providing the desired concentricity between the flux ring and the core element 12. For concentricity, the protrusions should be equally spaced around the circumference of the sleeve. As will be readily understood by a person of ordinary skill in the art, additional numbers of protrusions might be utilized as well.

Referring to FIG. 2A, in accordance with another aspect of the present invention, the protrusions extend longitudinally along a portion of a length of the core. Protrusion 46a illustrated on the left side of FIG. 2A is shown to extend generally along the length of the core corresponding to the indentation 47 formed in the core for receiving the wire coil forming magnetic flux generator 14. Alternatively, as illustrated on the right side of FIG. 2A, protrusion 46b may extend longitudinally generally along the entire length of the core element. Still further, the protrusions may extend as multiple protrusion sections along the length of the core which are aligned with spaces in between. The protrusions are shown as a single set of protrusions. However, multiple sets might be utilized and might be angularly offset from each other around the circumference of the sleeve.

To form the MR damping device of the present invention, the flux ring is press fit onto the sleeve protrusions. Therefore, in one embodiment, the protrusions are configured and dimensioned to have an outwardly radial dimension which is at least slightly greater than the inner diameter, or inner dimension of the flux ring 18. The protrusions may be formed to be slightly flexible so that they will deform to allow the flux ring to be pressed onto the sleeve. By press fitting the flux ring into position, the protrusions hold the flux ring both axially and radially in position, and concentrically aligned with the center axis 42 and core element 12. For example, shrink fitting or thermal press fitting might be used where the flux ring is heated above room temperature for expansion and the sleeve is cooled to shrink. The flux ring is then easily slid over the sleeve, and when both parts reach an equilibrium temperature, they stay in position with a snug fit. Alternatively, the protrusions might be dimensioned close to or the same as the inner diameter of the flux ring, wherein the flux ring may be more easily slid over the sleeve and protrusions. In such a case, the flux ring may have to be secured axially while the protrusions 46 keep the flux ring generally concentric with respect to the MR damping device. Again, the utilization of the protrusions, rather than separate fasteners for securing the flux ring, provides a self-centering feature without additional assembly steps, therefore reducing assembly costs.

In the embodiment of the invention wherein the sleeve or protrusions are molded over the core element and magnetic flux generator 14, the protrusions might be positioned concentrically around the sleeve 44 such that they are in line with the mold parting lines. Such a construction will further potentially eliminate excess flash associated with the molding process, and thus further result in an improvement in cost effectiveness in the assembly process. As noted above, suitable plastic or a moldable ceramic might be utilized to form or mold the sleeve 44 and protrusions 46. Illustrated in FIG. 2B, the protrusions are shown to have generally a triangular cross-section wherein one point of the triangle contacts the inner surface of the flux ring 18. However, other such shapes, such as a semi-circular shape, might also be utilized wherein a tangential radial point engages the inside surface of the flux ring. Still further, other protrusion shapes might also be utilized in accordance with the principles of the present invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A magneto-rheological damping device comprising:
   a core element for carrying a magnetic flux;
   a magnetic flux generator positioned adjacent to a portion of the core element and operable to generate a magnetic flux in the core element;
   a sleeve positioned over the core element and magnetic flux generator, the sleeve including a plurality of protrusions extending generally radially outwardly from a center of the core element;
   a flux ring surrounding the core element and sleeve and defining a passage between flux ring and core element for the flow of a magneto-rheological fluid, the flux ring operable for forming a magnetic circuit and confining a portion of the magnetic flux proximate the core element and in the passage;
   the sleeve protrusions configured to engage the flux ring and secure the flux ring in a position around the core element and sleeve.

2. The damping device of claim 1 wherein the sleeve with protrusions is molded over the core element and magnetic flux generator.

3. The damping device of claim 1 wherein the protrusions are formed integrally with the sleeve.

4. The damping device of claim 1 wherein the sleeve and protrusions are formed of one of a plastic and a ceramic.

5. The damping device of claim 1 wherein the protrusions extend longitudinally along a portion of a length of the core element.

6. The damping device of claim 1 wherein the protrusions extend longitudinally generally along the entire length of the core element.

7. The damping device of claim 1 wherein said protrusions extend radially outwardly generally an equal distance from the center of the core element and are operable to secure the flux ring generally concentrically around the core element and sleeve.

8. The damping device of claim 1 wherein the protrusions are positioned concentrically around the core in at least three positions for securing the flux ring.

9. The damping device of claim 1 wherein the flux ring is press fit onto the sleeve protrusions.

10. The damping device of claim 1 wherein said protrusions have a triangular cross section.

11. The damping device of claim 1 wherein the magnetic flux generator includes a wire coil wrapped around the core element.

12. A method of forming a magneto-rheological damping device, the method comprising:

providing a core element for carrying a magnetic flux;

positioning a magnetic flux generator adjacent to a portion of the core element for generating a magnetic flux in the core element;

positioning a sleeve over the core element and magnetic flux generator, the sleeve including a plurality of protrusions extending generally radially outwardly from a center of the core element;

surrounding the core element and sleeve with a flux ring and defining a passage between flux ring and core element for the flow of a magneto-rheological fluid, the flux ring operable for forming a magnetic circuit and confining a portion of the magnetic flux proximate the core element and in the passage;

engaging the flux ring with the sleeve protrusions and securing the flux ring in a position around the core element and sleeve.

13. The method of claim 12 further comprising molding the sleeve and protrusions over the core element and magnetic flux generator.

14. The method of claim 12 further comprising forming the protrusions integrally with the sleeve.

15. The method of claim 12 further comprising forming the sleeve and protrusions with one of a plastic and a ceramic.

16. The method of claim 12 wherein the protrusions extend longitudinally along a portion of a length of the core.

17. The method of claim 12 wherein the protrusions extend longitudinally generally along the entire length of the core.

18. The method of claim 12 further comprising wherein said protrusions extend radially outwardly generally an equal distance from the center of the core element, the method further comprising securing the flux ring generally concentrically around the core element and sleeve with the protrusions.

19. The method of claim 12 wherein the protrusions are positioned concentrically around the core in at least three positions for securing the flux ring.

20. The method of claim 12 further comprising press fitting the flux ring onto the sleeve protrusions.

* * * * *